July 23, 1929. A. J. HOLMAN 1,721,734
AUTOMATIC VARIABLE FRICTION DRIVE
Filed April 18, 1927 6 Sheets-Sheet 2
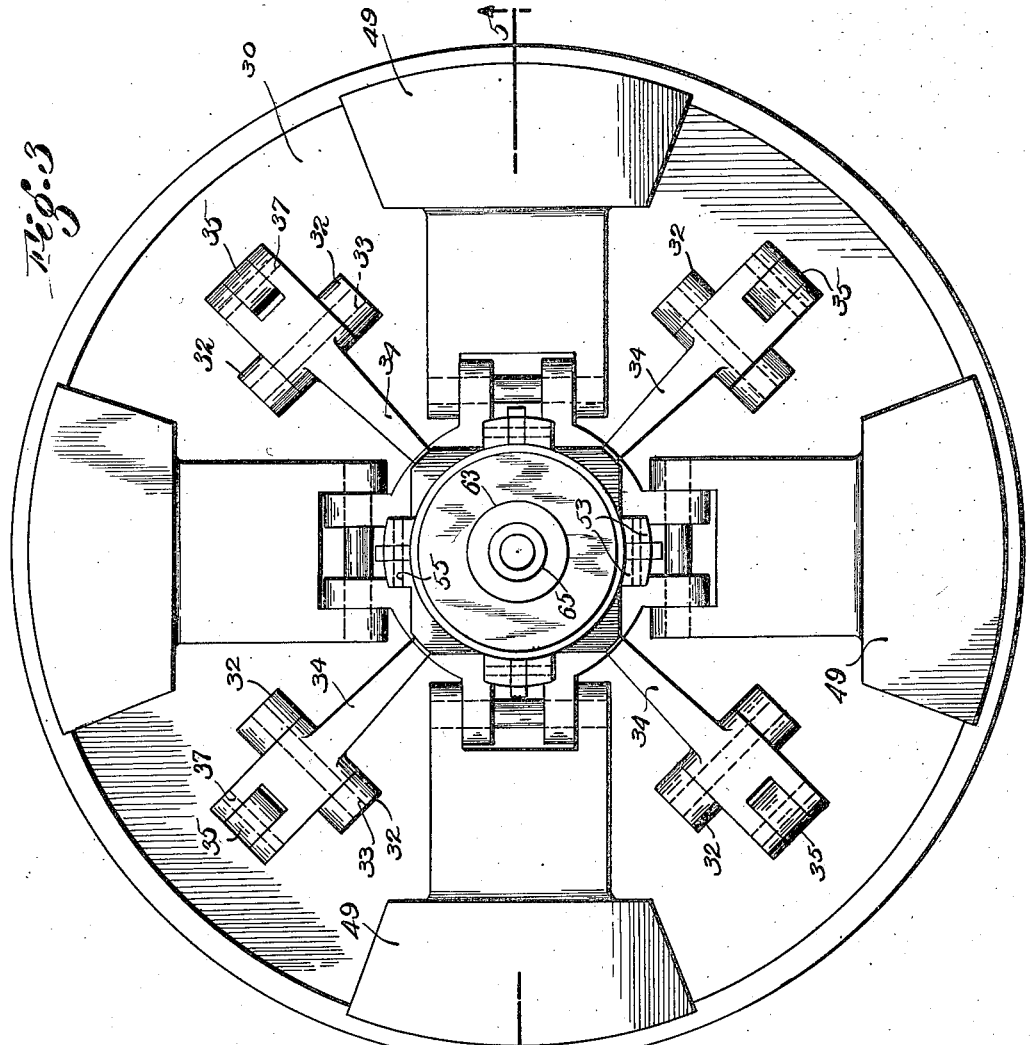
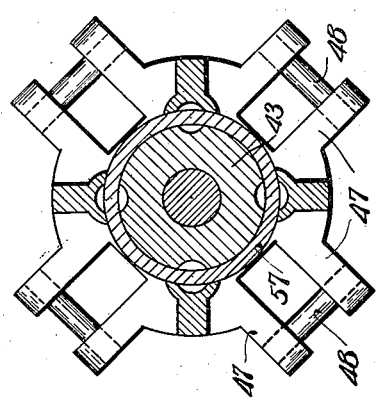

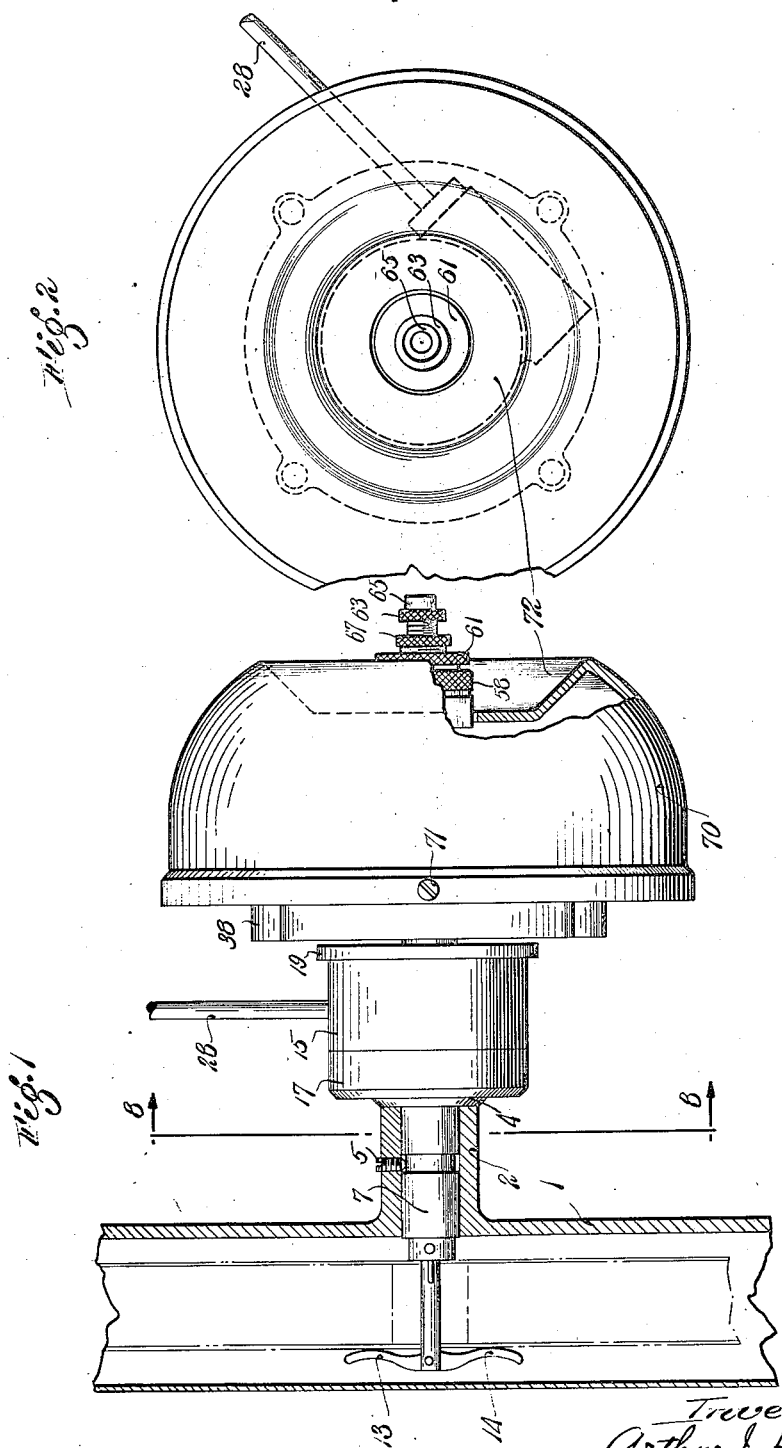

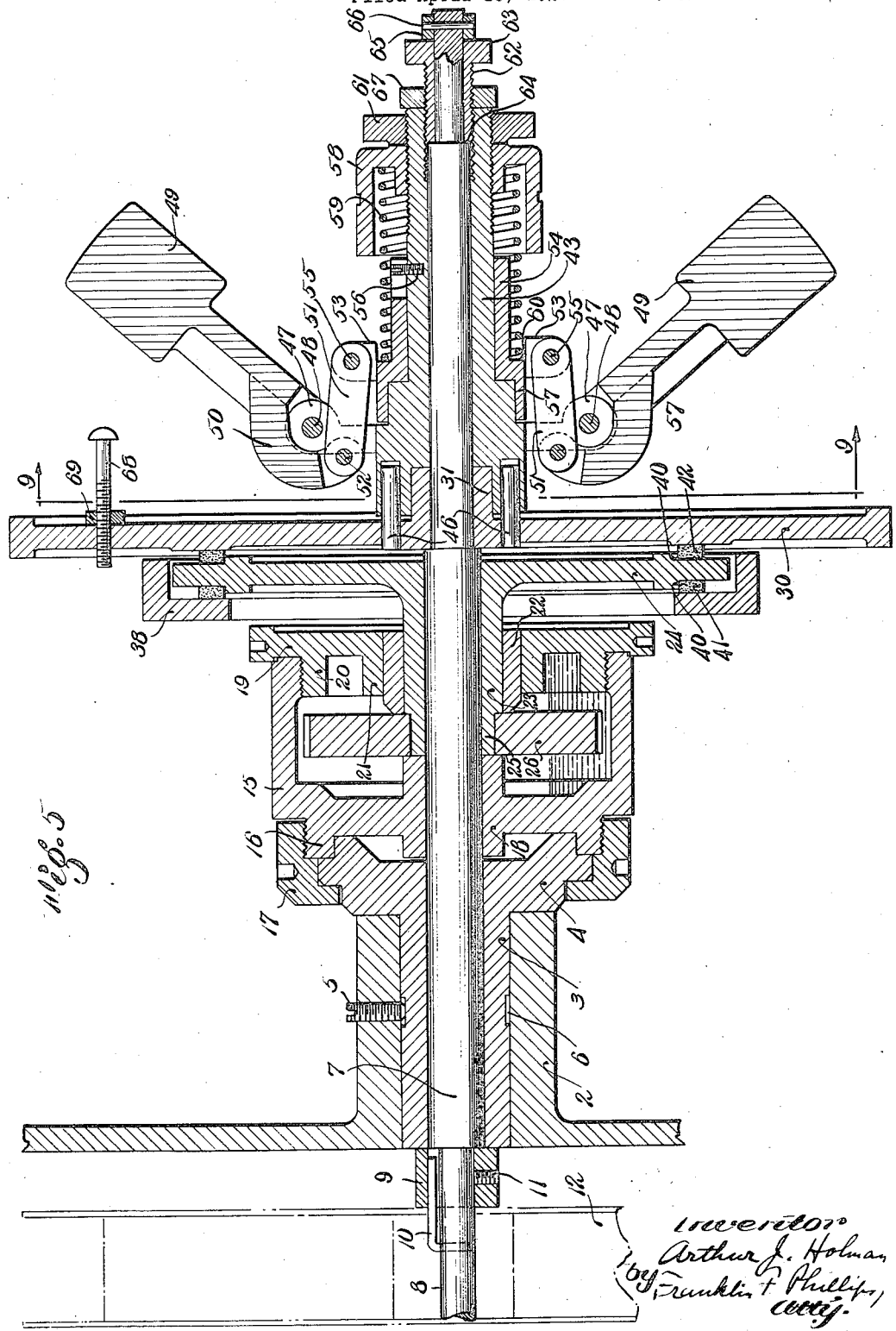

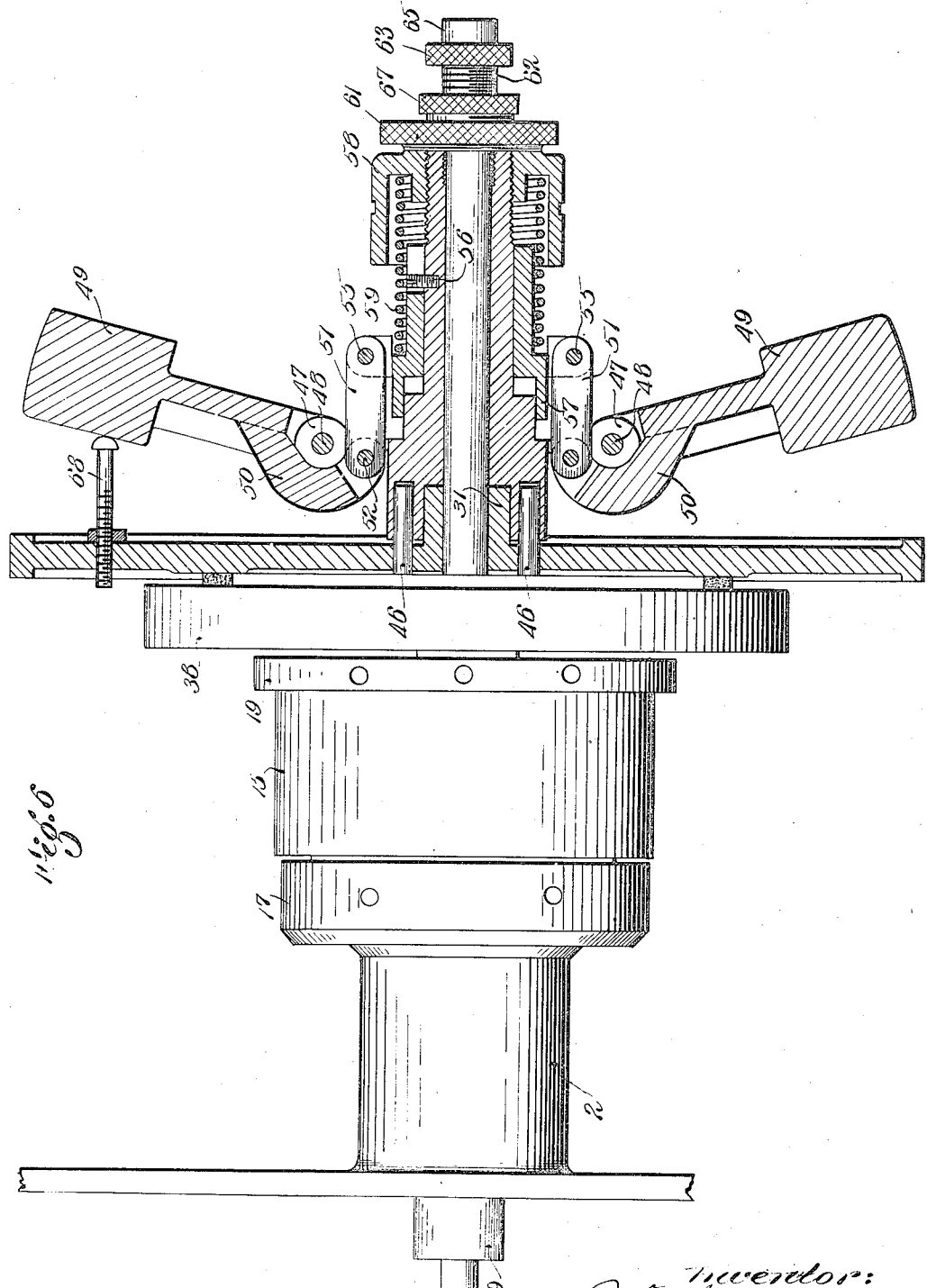

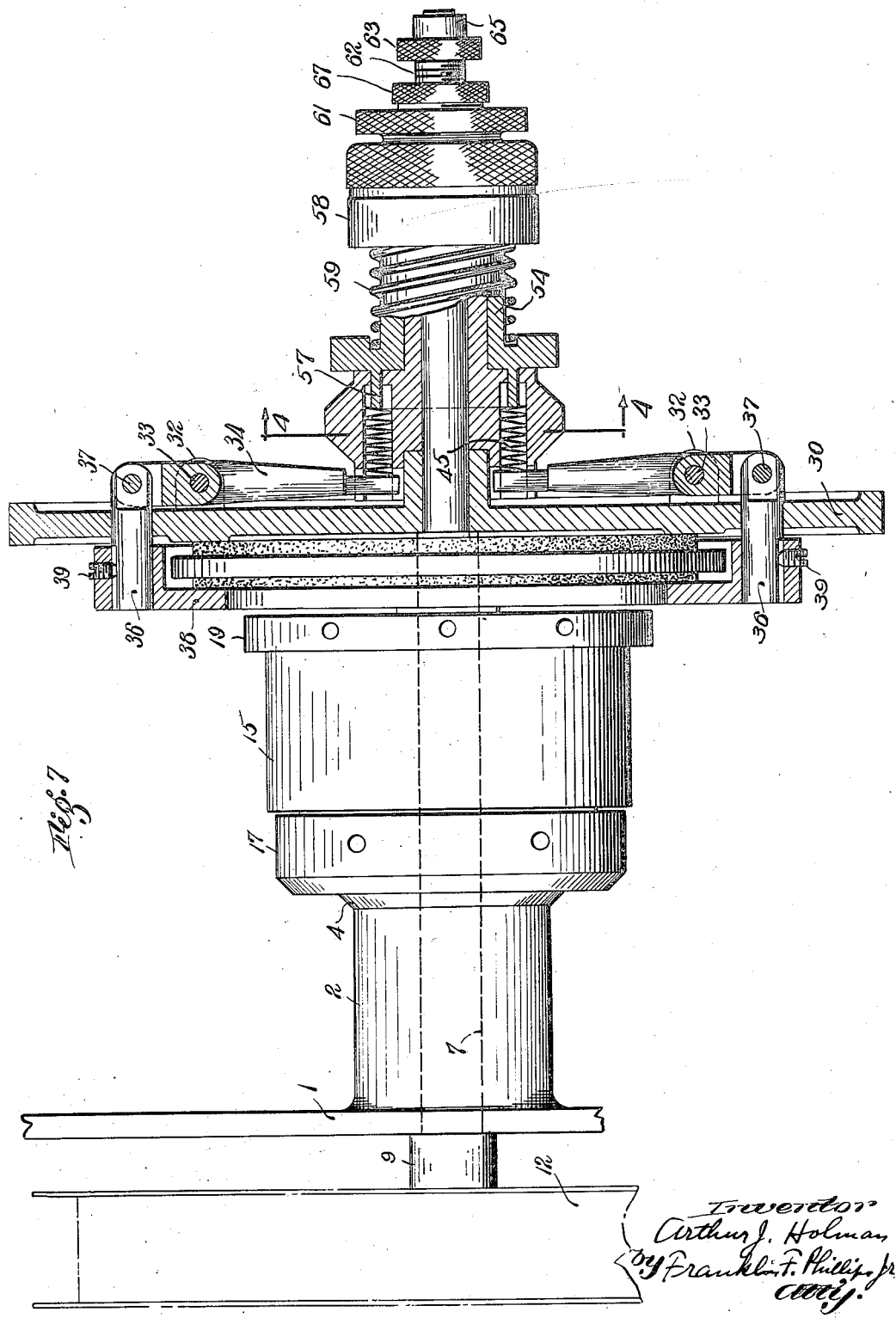

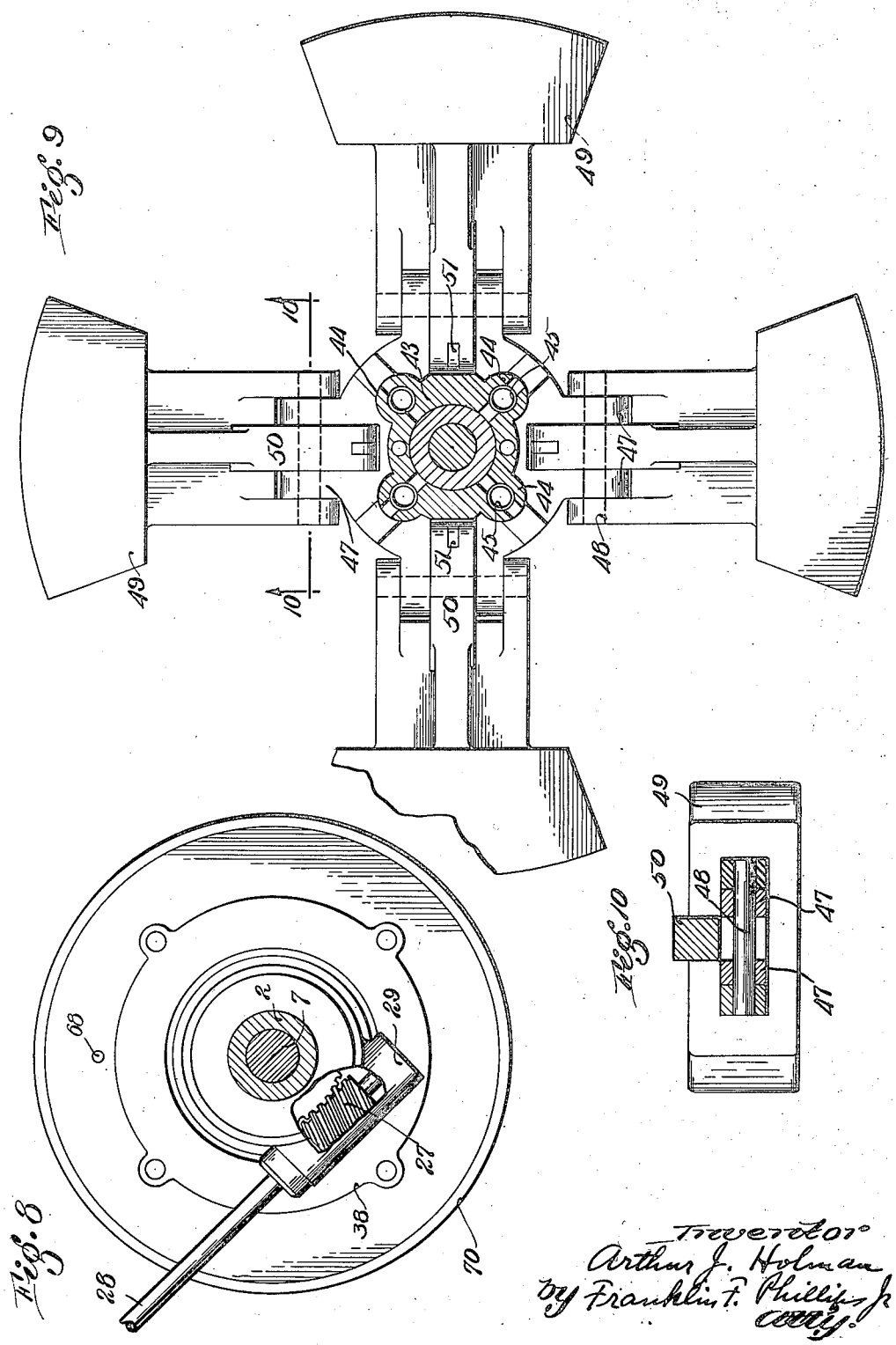

Patented July 23, 1929.

1,721,734

UNITED STATES PATENT OFFICE.

ARTHUR J. HOLMAN, OF BOSTON, MASSACHUSETTS.

AUTOMATIC VARIABLE FRICTION DRIVE.

Application filed April 18, 1927. Serial No. 184,737.

My invention relates to a type of friction drive designed to be used to actuate a spool whereon material is to be wound, and to operate in such a manner that the tension on the material being wound up may be kept approximately uniform at all diameters of the wound mass as the spool fills. Such a device is particularly useful in connection with the take-up reel of a moving picture projector which must at all times be rotated with sufficient power to draw the film through the "magazine valve," and at the same time not exert a sufficient pull upon the film to cause damage to the sprocket holes therein which are engaged with the so called "lower sprocket." A device of this sort must be responsive to the requirement of a reduced number of revolutions per minute as the diameter of the wound film increases, and at the same time sensitive to the need of an increasing torque. I shall therefore describe my invention as associated with the take-up reel of a moving picture projector although it will be obvious that it is capable of other uses.

My device may be best understood by reference to the accompanying drawings in which—

Fig. 1 is a side elevation of my device shown in connection with the take-up reel of a moving picture projector, showing in section the lower film magazine and the supporting bracket.

Fig. 2 is an end view.

Fig. 3 is an enlarged end view with the cover removed.

Fig. 4 is a cross section on line 4—4 of Fig. 7 showing the hinge mounting of centrifugal weights and adjacent parts.

Fig. 5 is a side view in longitudinal section of the whole device with the centrifugal weights in static position.

Fig. 6 is a side view of the whole device shown partly in longitudinal section, with the centrifugal weights in maximum speed position.

Fig. 7 is a side view of my device partly in section and arranged to show the lever arms for controlling friction, and connecting members.

Fig. 8 is a view on line 8—8 of Fig. 1, the driving-gear housing being partly broken away to show the driving gear arrangement.

Fig. 9 is a view on line 9—9 of Fig. 5 showing the arrangement of centrifugal weights and pressure springs.

Fig. 10 is a view on line 10—10 of Fig. 9.

Referring now more specifically to the drawings, 1 is the lower film magazine of a moving picture projector provided with a hub 2 within which is a sleeve 3 provided with a flange 4 (see Fig. 5). This sleeve 3 is retained in position by set-screw 5 which passes through hub 2 and enters a groove 6 in the periphery of the sleeve 3. The sleeve 3 forms a bearing for the reel-shaft 7, the extremity 8 of which is of lesser diameter and is provided with a collar 9 and key pin 10. The collar 9 is retained by set-screw 11 and shoulders on one side against the sleeve 3 and on the other side against the reel 12. The key pin 10 is adapted to engage a slot in the hub of reel 12 so as to carry the reel around as the shaft rotates. Hinged retaining clips 13 and 14 (Fig. 1) hold the reel on the end 8 of shaft 7.

A gear box 15 is provided with an annular extension 16, threaded on its outer surface so as to be retained in place by the ring nut 17 which is screwed thereon so as to clamp the gear box 15 securely to the flange 4 of the sleeve 3. The hub 18 of the gear box 15 provides a further bearing for the reel-shaft 7. The front end of the gear box 15 is closed by a cover 19 which is provided with two annular extensions 20 and 21. The annular extension 20 is threaded so as to be screwed into the threaded interior of the gear box 15. The annular extension 21 forms a hub into which is press fitted a bushing 22 which forms a bearing for the hub 23 of the friction disc 24. Upon the extension 25 of the hub 23, which extension is of of reduced diameter, is press fitted the helical gear 26 which is driven by the helical gear 27 (Fig. 8) fast on shaft 28 which enters a cylindrical boss 29 integral with the gear box 15. The reel-shaft 7 rotates within the hub 23. A circular plate 30 provided with a hub 31 is press fitted on the reel-shaft 7, the diameter of which is reduced so as to form a shoulder against which the plate 30 abuts.

Arranged 90° apart at right angles on the front face of the plate 30 are four pairs of bosses 32 (Figs. 3 and 7). Within each pair of these bosses is mounted a hinge pin 33 upon which rocks a radially disposed lever arm 34, the outer end of which is slotted to receive the end 35 of a cylindrical pin 36 which has been flattened on both sides adjacent the end. A hinge pin 37 connects the pin 36 with the lever arm 34, there being a substantial clearance of the pin 37 within the hole in the pin 36.

It will be observed from an examination of Fig. 7 that the pins 36 pass freely through holes in plate 30 and enter opposite holes in friction ring 38 which has an inturned flange enclosing the periphery of the friction disc 24. The pins 36, after being properly positioned in their respective holes in friction ring 38, are secured in place therein by set-screws 39 (Fig. 7).

The friction disc 24 is provided on each face with an annular shoulder 40, which shoulders position the leather friction rings 41 and 42, of which ring 41 bears at all times with light frictional contact against the friction ring 38 and the friction disc 24, while the ring 42 bears in a like manner against plate 30 and the friction disc 24.

A sleeve 43 is slidably mounted on reel-shaft 7, one end of the sleeve being bored to receive the hub 31 of plate 30. This end of sleeve 43 carries four cylindrical bosses 44 (Fig. 9) which are symmetrically placed around the axis and are bored to receive each a coil spring 45. Oppositely located in the end of the sleeve 43 are two cylindrical holes into which enter and slide pins 46 which are fixed in the plate 30. Radially arranged about sleeve 43 are four pairs of hinge brackets 47, each pair of which is located midway between cylindrical bosses 44. A hinge pin 48 is provided for each pair of bosses 47 whereon is mounted a centrifugal weight 49. A curved arm 50, integral with the weight 49, is slotted at its extremity to receive one end of link 51 which is retained by a pin 52, the other end of the link 51 passing between opposed lugs 53 on sleeve 54 and being retained by a pin 55.

This sleeve 54 is slidably mounted on sleeve 43 and is prevented from turning on said sleeve by the screw post 56 which is fast in sleeve 43 and projects into a slot in sleeve 54. An annular extension 57 on sleeve 54 contacts with each of the coil springs 45 and holds each of said springs against the end of a lever arm 34 which passes through a slot in a cylindrical boss 44.

The outer extremity of sleeve 43 is externally threaded to receive a hollow adjusting screw-cap 58 which embraces and retains one end of the coil spring 59, the other end of which butts against a shoulder 60 on sleeve 54. The adjusting screw-cap 58 is locked in position by the lock-nut 61. Into the end of sleeve 43 is screwed a threaded sleeve 62 which is provided with a nurled head 63. This sleeve 62 fits upon the extremity of the reel-shaft 7 which is reduced in diameter so as to provide a shoulder 64 against which the end of sleeve 62 contacts and the sleeve is held in this position by a collar 65 secured by pin 66 to the end of the shaft 7. A lock nut 67 retains the sleeve 62 from unintended rotation.

Adjustably mounted in plate 30 is a screw post 68 which may contact with and limit the spreading movement of the centrifugal weights 49. This screw post may be locked in the desired position by the lock nut 69. A cover 70 (Fig. 1) fits closely over the periphery of plate 30 and is retained thereon by screws 71. This cover 70 has an inset rear portion 72, provided with a round hole through which project the adjusting cap 58 and the nurled head 63 of the adjusting sleeve 62.

The operation of my device is as follows:—

Power being applied to shaft 28 rotation is imparted to the friction disc 24 through the gears 26 and 27. Rotation is also imparted to the plate 30 and to the friction ring 38 which is connected therewith by the pins 36 through the leather friction rings 41 and 42. At the instant of starting the frictional influence of these leather rings is at maximum for the reason that the annular extension 57 on sleeve 54 is at its farthest advanced position, under the influence of spring 59, so that the small coil springs 45 have the maximum thrust upon the ends of lever arms 34, thereby actuating friction ring 38 toward plate 30 with maximum pressure.

As the device accelerates the centrifugal weights 49 move outward, thereby, through their link connections with sleeve 54, backing off the sleeve 54 so that the thrust of annular extension 57 upon the small coil springs 45 is slightly and gradually relieved thus through the lever arms 34 and pins 36 relieving the pressure upon the friction surfaces which transmit the driving force, thus reducing the driving torque between the constant speed friction disc 24 and the variable speed plate 30. The extent of this reduction of driving torque is limited and controlled by the positioning of stop post 68 which is experimentally set to produce a condition such that the desired film winding pull is secured for the initial condition of winding when the diameter of the winding mass is least. As the diameter of the wound mass increases, the film, of course, being fed to it at a uniform rate, there is need for a diminishing rate of reel rotation because of the growth of circumference of the wound mass. Moreover, as a constant pull is required on the film there is need for an increased driving torque. This is taken care of automatically by an increase of pressure at the friction surfaces resulting from the collapsing tendency of the centrifugal weights 49 due to the reduced speed of the reel-shaft 7. Thus the film pull exerted by the reel is maintained fairly constant by the continued slow collapse of the centrifugal weights.

The film pull at the maximum diameter of the wound mass is regulated by means of the screw adjustment sleeve 62 which may be turned to actuate sleeve 43 inward or outward, thus increasing or decreasing the pressure of the small coil springs 45 upon the lever arms 34.

The film pull at intermediate conditions of wound mass diameter may be regulated by varying the position of screw-cap 58. Backing off this screw-cap thereby reducing the pressure of spring 59 upon the sleeve 54 reduces the resistance to the effect of centrifugal force on the weights 49, thereby permitting them to act more readily to reduce the pressure upon the friction surfaces in the manner already indicated, thereby reducing winding pull on the film. Turning up the screw-cap 58 has, of course, the opposite effect.

It is obvious that since the several adjustments all affect the pressure upon the small springs 45 they are interrelated and the desired result, i. e. uniform film pull, is obtained by trial of the apparatus. An adjustment suitable for a take-up rate of sixty feet of film per minute will operate satisfactorily for a substantially increased rate of film take-up; but for extreme rates of film take-up it will be found necessary to make slight readjustments.

The usual film take-up device exerts a constant pressure at the frictional surfaces for all reel speeds and is adjusted to give sufficient film tension to wind the film at the maximum diameter of the wound mass. This results in either very loose winding of the outer portion of the film on the reel or excessive pull on the film during the early stages of take-up. Either of these conditions will cause serious damage to the film; excessive pull results in broken sprocket hole corners, and loose winding necessitates tightening the film on the reel after removal from the magazine, this operation in general being productive of serious scratching of both the celluloid and emulsion surfaces of the film. On subsequent projection these scratches result in the defect known as "rain" which is very common in film that has been in use for any length of time.

Attempts have been made to secure uniform take-up tension by using frictional means which would increase the torque in proportion to the increasing weight of the wound mass. These devices prove satisfactory for horizontal mounting of the take-up reel, in which case the device is simple, but for the much more desirable vertically mounted reel no device of this type has proven satisfactory.

Centrifugal devices have been tried but have not been useful due to the fact that they were not sufficiently sensitive to operate at the relatively low speeds at which a take-up reel runs. My device, because of the balanced spring action and the balancing of centrifugal force on the centrifugal weights, is very sensitive to small speed changes.

Although I have shown and described my invention in connection with moving picture projector film take-up, nevertheless it will be readily understood that my apparatus is equally useful whatever the winding operation may be provided it is necessary or desirable to maintain uniform tension upon the material being wound and a uniform rate of take-up.

Having thus fully described my invention, what I claim is—

1. In a device of the character specified the combination of a reel-shaft, a sleeve arranged to slide longitudinally with respect to the reel-shaft, centrifugal means connected with said sleeve and adapted to slide the same, a driven part, a friction driving part springs arranged to back upon and be compressed by one end of said sleeve and to supply the pressure of said driven part of said device against said friction driving part, and a spring arranged to act upon said sleeve in a manner whereby it may balance the combined forces of said first mentioned springs and the force of said centrifugal means.

2. In a device of the character specified the combination of a reel-shaft, a sleeve arranged to slide longitudinally with respect to the reel-shaft, centrifugal means connected with said sleeve and adapted to slide the same, a driven part, a friction driving part springs arranged to back upon and be compressed by one end of said sleeve and to supply the pressure of said driven part of said device against said friction driving part, a spring arranged to act upon said sleeve in a manner whereby it may balance the combined forces of said first mentioned springs and the force of said centrifugal means, and means for adjusting the tension of said springs.

3. In a device of the character specified the combination of a reel-shaft, a friction disc rotatably mounted on said reel-shaft, means for actuating said friction disc, means fast mounted on said reel-shaft and arranged to press with frictional engagement upon said disc so as to be rotated thereby, and centrifugal elements connected with said means fast mounted on said reel-shaft, said means fast mounted on said reel-shaft having associated therewith a sliding sleeve connected with said centrifugal elements, coil springs, mounted in said means fast mounted on said reel-shaft and arranged to supply the pressure of said means fast mounted on said reel-shaft against said friction disc, a spring arranged to press said sliding sleeve against said coil springs and to balance the combined influence of said coil springs and the force of the centrifugal movement of said centrifugal elements.

4. In a device of the character specified the combination of a reel-shaft, a friction disc rotatably mounted on said reel-shaft, means for actuating said friction disc, a plate fast mounted on said reel-shaft adjacent to said friction disc, a friction ring slidably mounted on the side of said plate adjacent said friction disc in a manner whereby it may be moved slightly toward or away from the said plate so as to contact with varying pressure against said friction disc, a sleeve slidably mounted on said reel-shaft, pins on said plate, said sleeve being provided with cylindrical holes to receive the ends of said pins, coil springs loosely supported in other cylindrical holes in said sleeve, a second sleeve slidably mounted on said sleeve and provided with an annular projection arranged to pass through an annular slot in said first mentioned sleeve and bear upon one end of each of said coil springs and compress the same, lever arms hinged on the face of said plate against the inner end of each of which one of said springs bears, pins slidably mounted in said plate and attached to said friction ring, each of said pins being connected to the outer end of a lever arm, centrifugal elements hingedly mounted on said first mentioned sleeve, a link connecting each of said centrifugal elements to said second sleeve in a manner whereby the increasing effect of centrifugal action on said centrifugal elements may move said second sleeve so as to diminish the compressing influence of said annular extension thereof upon said coil springs and thereby reduce the pressure of said coil springs upon said lever arms, and spring means arranged yieldingly to oppose the movement of said second sleeve in response to the influence of the centrifugal movement of the centrifugal elements and balance the combined forces of said coil springs and said centrifugal elements.

5. In a device of the character specified the combination of a reel-shaft, a friction disc rotatably mounted on said reel-shaft, means for actuating said friction disc, a plate fast mounted on said reel-shaft adjacent to said friction disc, a friction ring slidably mounted on the side of said plate adjacent said friction disc in a manner whereby it may be moved slightly toward or away from the said plate so as to contact with varying pressure against said friction disc, a sleeve slidably mounted on said reel-shaft, pins on said plate, said sleeve being provided with cylindrical holes to receive the ends of said pins, coil springs loosely supported in other cylindrical holes in said sleeve, a second sleeve slidably mounted on said sleeve and provided with an annular projection arranged to pass through an annular slot in said first mentioned sleeve and bear upon one end of each of said coil springs and compress the same, lever arms hinged on the face of said plate against the inner end of each of which one of said springs bears, pins slidably mounted in said plate and attached to said friction ring, each of said pins being connected to the outer end of a lever arm, centrifugal elements hingedly mounted on said first mentioned sleeve, a link connecting each of said centrifugal elements to said second sleeve in a manner whereby the increasing effect of centrifugal action on said centrifugal elements may move said second sleeve so as to diminish the compressing influence of said annular extension thereof upon said coil springs and thereby reduce the pressure of said coil springs upon said lever arms, spring means arranged yieldingly to oppose the movement of said second sleeve in response to the influence of the centrifugal movement of the centrifugal elements and balance the combined forces of said coil springs and said centrifugal elements, and means for adjusting simultaneously the static position of said sleeves with respect to said plate thereby varying the normal compression of said coil springs between said annular extension on said second sleeve and the inner ends of said lever arms.

6. In a device of the character specified the combination of a reel-shaft, a friction disc rotatably mounted on said reel-shaft, means for actuating said friction disc, a plate fast mounted on said reel-shaft adjacent to said friction disc, a friction ring slidably mounted on the side of said plate adjacent said friction disc in a manner whereby it may be moved slightly toward or away from the said plate so as to contact with varying pressure against said friction disc, a sleeve slidably mounted on said reel-shaft, pins on said plate, said sleeve being provided with cylindrical holes to receive the ends of said pins, coil springs loosely supported in other cylindrical holes in said sleeve, a second sleeve slidably mounted on said sleeve and provided with an annular projection arranged to pass through an annular slot in said first mentioned sleeve and bear upon one end of each of said coil springs and compress the same, lever arms hinged on the face of said plate against the inner end of each of which one of said springs bears, pins slidably mounted in said plate and attached to said friction ring, each of said pins being connected to the outer end of a lever arm, centrifugal elements hingedly mounted on said first mentioned sleeve, a link connecting each of said centrifugal elements to said second sleeve in a manner whereby the increasing effect of centrifugal action on said centrifugal elements may move said second sleeve so as to diminish the compressing influence of said annular extension thereof upon said coil springs and thereby reduce the pressure of said coil springs upon said lever arms, spring means arranged yieldingly to oppose the movement of said second sleeve in response to the influence of the centrifugal movement of the centrifugal elements and balance the combined forces of said coil springs and said centrifugal elements, means for adjusting simultaneously the static position of said sleeves with respect to said plate thereby varying the normal compression of said coil springs between said annular extension on said second sleeve and the inner ends of said lever arms, and means for adjusting the tension of said spring means arranged yieldingly to oppose the movement of said second sleeve in response to the influence of the centrifugal elements.

In witness whereof I have hereunto affixed my signature.

ARTHUR J. HOLMAN.